United States Patent [19]
Knapp et al.

[11] Patent Number: 6,162,268
[45] Date of Patent: Dec. 19, 2000

[54] POLISHING SLURRY

[75] Inventors: James Kent Knapp, Pittsboro; Doris Kwok, Fishers, both of Ind.

[73] Assignee: Praxair S. T. Technology, Inc., Danbury, Conn.

[21] Appl. No.: 09/303,920

[22] Filed: May 3, 1999

[51] Int. Cl.[7] .................................. C23F 1/14; C23F 4/00
[52] U.S. Cl. ................................. 51/302; 51/307; 51/308; 51/309; 106/5; 106/211.1; 106/215.5; 106/217.01; 106/217.3; 216/89; 451/36
[58] Field of Search .................................. 451/36; 51/302, 51/307, 308, 309; 106/5, 24.1, 215.2, 217.01, 217.3; 216/89

[56] References Cited

U.S. PATENT DOCUMENTS

| | | | |
|---|---|---|---|
| 1,452,093 | 4/1923 | Pollack | 51/302 |
| 3,652,301 | 3/1972 | Damron | 106/5 |
| 4,038,048 | 7/1977 | Thrower, Jr. | 51/298 |
| 4,104,213 | 8/1978 | Chiang et al. | 260/17.3 |
| 4,544,377 | 10/1985 | Schwen | 51/298 |
| 4,696,697 | 9/1987 | Kitano et al. | 106/3 |
| 4,705,566 | 11/1987 | Senda et al. | 106/3 |
| 4,769,046 | 9/1988 | Senda et al. | 51/293 |
| 4,956,015 | 9/1990 | Okajima et al. | 106/3 |
| 5,137,541 | 8/1992 | Foster | 51/301 |
| 5,164,433 | 11/1992 | Ricci et al. | 524/47 |
| 5,286,405 | 2/1994 | Rennie et al. | 252/174.17 |
| 5,366,542 | 11/1994 | Yamada et al. | 106/3 |

FOREIGN PATENT DOCUMENTS

WO98/23697  4/1998  WIPO .

Primary Examiner—C. Melissa Koslow
Attorney, Agent, or Firm—Blake T. Biederman

[57] ABSTRACT

The invention provides a mixture for polishing surfaces. The mixture includes polishing particles having an average size of less than 10 μm and water. It also includes an accelerator for chemically attacking a surface and a starch for reducing vibration of polishing machines.

10 Claims, No Drawings

POLISHING SLURRY

BACKGROUND OF THE INVENTION

Typical manufacturing processes for memory hard disk media involve plating a disk substrate with a layer of nickel and polishing the nickel surface to obtain a smooth, flat surface that is suitable for application of a layer of magnetic storage media. The computer industry's requirements for increased storage capacity on hard disk drives has necessitated a substantial increase in areal density (data storage capacity per unit surface area) on the disk media. This demand for higher areal densities has required manufacturing improvements of rigid hard disks, including enhanced plating uniformity, reduced surface roughness after polishing, improved flatness and waviness, reduction of defects such as pits and scratches, and enhanced texturing characteristics. The disks' polishing process is an important factor that influences many of these new requirements.

Significant improvements in the polishing process of nickel-plated hard disks have occurred in recent years. Improvements have been made in the equipment used to polish the disks, allowing for better control of post-polish disk flatness. Enhancements in surface inspection methodology have allowed disk manufacturers to inspect for small surface defects previously undetectable, such as pits and scratches. This technology has led to optimization of polishing parameters to reduce defects. Other advances in the area of consumables include: pads, abrasive slurry, and cleaning chemicals. Demand for additional improvements in disk quality have placed an emphasis on precision and consistency of the consumable materials.

Advancements made in the manufacturing of abrasive polishing slurries in the mid 1990's enabled disk manufacturers to apply two polishing steps in their processes. The first step employs a coarse abrasive slurry (nominal 0.3–0.8 micron diameter) to achieve good planarization and fast stock removal. The second step employs a smaller abrasive (nominal 0.2–0.3 micron diameter) that yields a very smooth (Ra less than 6 Å) surface finish with little or no defects. The two-step polishing concept has become the norm for most disk manufacturers.

As polishing technology has evolved, several disk manufacturers have experienced a severe problem with modern polishing machines, especially in the first step application. High friction in the polishing zone involving polyurethane polishing pads, fiberglass disk carriers and the nickel-plated disks can result in a vibrating machine. This vibration results in a loud stick-slip event that continues throughout the polish cycle. The problem can be so severe that the disk carriers are damaged at the gear teeth, and chips of fiberglass debris contaminate the polishing zone. Scratching of the disks results from the fiberglass debris. In an effort to reduce the tendency to cause scratching, some manufacturers have modified their polishing parameters, such as reducing applied pressure. Generally these modifications result in reduced productivity. Furthermore, the resulting cost of frequently replacing fiberglass carriers is very high.

Vibration of this nature is problematic in polishing hard disks for several reasons: 1) it causes an unpleasant loud noise making it difficult for technicians to work around; 2) it leads to rapid degradation of the fiberglass disk carriers that is costly; 3) it can lead to severe scratching if the disk carriers break apart at the gear teeth locations; 4) it can require the manufacturer to reduce the applied machine pressure that causes low removal rate of the nickel and lower productivity; and 5) it can lead to non-uniform surface features on the polished disk.

In general, slurry manufacturers have modified slurry performance with several additives. For example, H. Thrower, Jr., in U.S. Pat. No. 4,038,048, discloses a lapping gel for sharpening cutting edges of lawnmowers. A carboxy vinyl polymer holds the gel's grinding grit in suspension. In addition, R. Schwen, in U.S. Pat. No. 4,544,377, discloses a grinding, lapping and polishing compound. This polishing compound relies upon 15 to 85 weight percent polymeric glycol of ethylene oxide, propylene oxide or butylene oxide or their mono-ethers as its base compound. These polymers have a molecular weight between 500 and 25,000.

In addition, slurry manufactures have altered suspensions with additional additives to improve polishing rates. For example, Okajima et al., in U.S. Pat. No. 4,956,015, disclose a polishing composition that contains water, $\alpha$-alumina and boehmite. The boehmite affects the water-based dispersion and improves grinding properties. Furthermore, Yamada et al., in U.S. Pat. No. 5,366,542, disclose a polishing composition containing water, alumina and a chelating agent. The chelating agent alters the alumina dispersion to improve polishing performance.

The most common additions however are cellulose thickeners and surfactants. Cellulose-based thickeners result in an increase in the slurry viscosity. Cellulose-based thickeners can improve lubricity of a polishing slurry. These slurries however require excessive amounts of thickeners to significantly affect disk vibration. And these thickeners can form an undesirable buildup of slurry in the pores of the polishing pads. Surfactants (anionic, cationic and nonionic) also increase lubricity. These additions however, can lead to excessive foaming of the slurry in the distribution system. Since this foaming can reduce removal rate, it is undesirable. In some cases, disk manufacturers have sought to reduce vibration by simply reducing machine pressure in the polishing zone.

It is an object of the invention to reduce polishing machine vibration for eliminating loud noises associated with these machines.

It is a further object of the invention to increase the life of fiberglass carriers.

It is a further object of the invention to reduce contamination in the polishing zone.

It is a further object of the invention to reduce the buildup of slurry and debris in the pads.

It is a further object of this invention to polish with higher pressures to achieve faster polishing rates.

SUMMARY OF THE INVENTION

The invention provides a mixture for polishing surfaces. The mixture includes polishing particles having an average size of less than 10 $\mu$m and water. It also includes an accelerator for chemically attacking a surface and a starch for reducing vibration of polishing machines.

The method provides a polishing slurry to polish objects. The polishing slurry includes water, polishing particles, an accelerator to chemically remove a surface, and a starch dissolved into the water. Introducing the polishing slurry between a polishing pad and the surface prepares the slurry for polishing. Applying pressure between the polishing pad and the surface provides the necessary force to remove material from the objects' surface. Finally, rotating the polishing pad polishes the surface with the starch reducing vibration between the polishing pad and the surface.

DESCRIPTION OF PREFERRED EMBODIMENT

The present invention, involving addition of a starch to an abrasive slurry, prevents machine vibration, even after application of excessive pressures by a polishing machine. This starch does not foam or form an undesirable buildup of slurry or debris. In fact, the additive helps to prevent slurry buildup in pads. Furthermore, the starch does not compromise removal rates. The starch prevents machine vibration and increases acceptable polishing pressures that facilitate higher removal rates. Furthermore, it operates with a wider range of pressures that allow manufacturers to optimize their processes for improving the uniformity of thickness from one side to the other. This feature is commonly referred to as "side to side thickness" or "AB Delta" —if the desired side-to-side is 0.0, it implies that polishing removed an equal thickness layer from each side of the disk. When the polishing process is adjusted inaccurately, then the side-to-side will be well above zero. This results in a residual stress gradient in the disk that leads to poor flatness.

In particular, the addition of a starch unexpectedly reduces polishing vibration. Advantageously, the starch ranges from about 0.1 to 40 wt %. Unless specifically expressed otherwise, this specification refers to point-of-use compositions in weight percent. Most advantageously, the slurry contains about 0.25 to 20 wt % rice starch. Advantageously, the starch is selected from the group consisting of barley, corn, potato, rice, sago, tapioca, wheat and yucca. Most advantageously, this starch dissolves completely in water before its addition to the slurry. Although effective at reducing undesirable vibration, potato starch has a lower solubility in water than rice starch.

Advantageously, the polishing particles are selected from the group consisting of metal oxides, metal nitrides, metal carbides, metal borides, silicon compounds and diamond. The "slurry" most advantageously consists of an abrasive component of polishing particles dispersed in water. Advantageously, the polishing particles have a concentration of about 3–80 wt %. Most advantageously, the slurry contains about 3–20 wt % polishing particles. These particles have an average size of less than about 10 $\mu$m. Most advantageously, these particles have an average size of less than about 5 $\mu$m. Aluminum oxide or alumina particles are particularly effective. Particle size of the aluminum oxide most advantageously ranges from 0.1 to 3.0 micron mean diameter, as measured by light scattering, preferably 0.2 to 1.0 microns. The aluminum oxide material has a surface area ranging from 4 to 50 $m^2$/g, preferably 8 to 15 $m^2$/g, and is predominantly in the form of its alpha crystal structure. A range of about 4 to 50 wt % is advantageous for alumina particles.

The slurry also contains an accelerator such as a chemical oxidizer to attack the surface and to enhance the polishing removal rate. Advantageously, the accelerator is selected from the group consisting of acetic acid, citric acid, hydrochloric acid, hydrofluoric acid, nitric acid, sulfuric acid, metal nitrates and metal sulfates. Typical chemical accelerators include aluminum nitrate, nitric acid, nickel nitrate, magnesium nitrate. An addition of about 1 to 50 wt % advantageously chemically attacks the surface. Manufacturers typically diluted the slurry at the point-of-use to a dilution ratio of three parts water to one part slurry (by volume). Final solids content at the point-of-use most advantageously ranges between 4 and 10% by weight, depending on the application.

The optional addition of up to about 15% viscosity modifiers or thickeners, such as cellulose polymers, xanthan gum, carbohydrate polymers, or up to about 15% surfactants, such as ionic, anionic and cationic, or nonionic surfactants can increase the lubricity of a polishing slurry. The following experimental data show that starch provides an acceptable solution to disk vibration.

EXAMPLE 1

The addition of starch allows one to increase the applied machine pressure without experiencing vibration.

TABLE 1

| Point-of-Use Rice Starch (wt %) | Maximum Pressure* (lbs./in² disk area) | Maximum Pressure* (kPa disk area) |
|---|---|---|
| 0 | 0.9 | 6.2 |
| 0.25 | 0.9 | 6.2 |
| 1.25 | 2.0 | 13.8 |
| 2.5 | 3.1 | 21.4 |

*Maximum pressure applied to the polishing zone before vibration event occurred.

Abrasive slurry used was Praxair 0.6 micron aluminum oxide. Polisher used was a Speedfam 9B with Rodel 750 pads. The slurries tested in Examples 1 to 4 contained 7% alumina, 0.05% aluminum sulfate, 3% aluminum nitrate, various amounts of rice starch, 0.03% thickener (cellulose), 0.001% organic salt of polycarboxylic acid (defoamer) and balance water. Advantageously, the disk applies a polishing pressure of at least 10 kPa without experiencing excessive vibration. Most advantageously, it applies at least 15 kPa without experiencing the excessive vibration.

EXAMPLE 2

An addition of carbohydrate polymer results in a reduction of surface roughness (Ra)

TABLE 2

| Point-of-Use Rice Starch (wt %) | Average Roughness, Ra (Å) |
|---|---|
| 0 | 17.6 |
| 1.25 | 16.1 |
| 2.5 | 15.3 |

Roughness was measured using Veeco TMS 2000 laser scattering device.

Measurements were taken after the fifth polishing cycle on new Rodel Politex 750 pads (three break-in runs were performed). Abrasive slurry used was Praxair 0.6 micron aluminum oxide. Polisher used was a Speedfam 9B.

EXAMPLE 3

Addition of starch in amounts of 1.25% or less does not cause a reduction in removal rate.

TABLE 3

| Point-of-Use Rice Starch (wt %) | Removal Rate ($\mu$in/min) | Removal Rate ($\mu$m/min) |
|---|---|---|
| 0 | 18.4 | 0.47 |
| 1.25 | 18.2 | 0.46 |
| 2.5 | 15.0 | 0.38 |

This slurry readily removes metals, such as nickel, at a rate of at least 0.3 $\mu$m/min. Most advantageously, it removes metal at a rate of at least 0.4 $\mu$m/min.

EXAMPLE 4

Addition of carbohydrate polymer results in reduction in slurry buildup of the polishing pads. Typical buildup requires pad cleaning every three to five cycles.

TABLE 4

| Point-of-Use Rice Starch (wt %) | Pad Buildup Characteristics |
|---|---|
| 0 | Substantial Pad Buildup after 5 cycles (concentric rings of slurry) |
| 1.25 | Slight Buildup in pads after 10 cycles . . . none after 5 cycles |
| 2.5 | Slight Buildup in pads after 10 cycles . . . none after 5 cycles |

Abrasive slurry used was Praxair 0.6 micron aluminum oxide. Polisher used was a Speedfam 9B. Pads were Rodel 750. The nominal composition for most advantageous polishing contains, by weight percent, 7 alumina, 0.05 aluminum sulfate, 3 aluminum nitrate, 1.4 rice starch, 0.03 thickener for a 1.5 to 2 cP viscosity, 0.001 defoamer (salt of polycarboxylic acid) and balance water.

The starch additive provides several advantages.

First, the invention eliminates pad sticking and reduces machine vibration. This eliminates loud noise in the working area of these machines. Second, it increases the life of polishing carriers. For example, fiberglass carriers can operate for numerous polishing runs by eliminating the stick-slip friction with conventional slurries. Third, it prevents carrier wear to reduce scratching and to reduce contamination in the polishing zone. Fourth, it reduces the buildup of slurry and debris such as nickel in the pads. This reduces the frequency of pad cleaning. Finally, it facilitates the use of higher pressures that lead to faster polishing rates.

Although the invention has been described in detail with reference to a certain particularly preferred embodiment, those skilled in the art will recognize that there are other embodiments of the invention within the spirit and the scope of the claims.

What is claimed is:

1. A mixture for polishing surfaces comprising, by weight percent, about 3 to 80 polishing particles, the polishing particles having an average size of less than about 10 $\mu$m, about 1 to 50 accelerator for chemically attacking a surface, about 0.1 to 40 starch and balance water and incidental impurities.

2. The mixture of claim 1 wherein the starch is selected from the group consisting of barley, corn, potato, rice, sago, tapioca, wheat and yucca.

3. The mixture of claim 1 wherein the starch consists of about 0.25 to 20 weight percent rice starch.

4. The mixture of claim 1 wherein the polishing particles particles are selected from the group consisting of metal oxides, metal nitrides, metal carbides, metal borides and diamond.

5. The mixture of claim 1 wherein the polishing particles consist of about 4 to 50 weight percent alumina and the polishing particles have an average size of less than about 5 $\mu$m.

6. The mixture of claim 1 wherein the accelerator is selected from the group consisting of acetic acid, citric acid, hydrochloric acid, hydrofluoric acid, nitric acid, sulfuric acid, metal nitrates and metal sulfates.

7. A method of polishing comprising the steps of
   (a) providing a polishing slurry, the polishing slurry including by weight percent, about 3 to 80 polishing particles, the polishing particles having an average particle size of less than about 10 $\mu$m, about 1 to 50 accelerator to chemically remove a surface, and about 0.1 to 40 starch dissolved in a balance of water and incidental impurities;
   (b) introducing the polishing slurry between a polishing pad and the surface;
   (c) applying pressure between the polishing pad and the surface; and
   (d) rotating the polishing pad to polish the surface with the starch reducing vibration between the polishing pad and the surface.

8. The method of claim 7 wherein the surface contains nickel and rotating the polishing pad removes nickel at a rate of at least 0.3 $\mu$m/min.

9. The method of claim 7 wherein the surface contains nickel and the rotating the polishing pad removes nickel at a rate of at least 0.4 $\mu$m/min.

10. The method of claim 7 wherein the applying pressure results in at least 10 kPa between the polishing pad and the surface without excessive vibration between the polishing pad and the surface.

* * * * *